July 26, 1932. W. T. COMER 1,869,346
APPARATUS FOR CONTINUOUS PRODUCTION OF CARBON DIOXIDE ICE
Filed Dec. 28, 1929

Inventor
W.T. Comer

By Brown & Phelps
Attorney

Patented July 26, 1932

1,869,346

UNITED STATES PATENT OFFICE

WILLIAM T. COMER, OF ATLANTA, GEORGIA, ASSIGNOR TO CRYSTAL CARBONIC LABORATORY, OF ATLANTA, GEORGIA, A CORPORATION OF GEORGIA

APPARATUS FOR CONTINUOUS PRODUCTION OF CARBON DIOXIDE ICE

Application filed December 28, 1929. Serial No. 417,153.

The invention relates to the production of solid carbon dioxide in a compact mass in a form known as carbon dioxide ice, and has as an object the provision of a continuous process for such production.

It is a further object of the invention to provide a process of producing carbon dioxide ice out of contact with air so as to avoid the inclusion of water ice from atmospheric moisture.

It is a further object of the invention to provide an apparatus for carrying out the process.

It is a further object of the invention to provide an apparatus for producing carbon dioxide ice which will be substantially continuous in operation and which will solidify a large proportion of the compressed carbon dioxide delivered to the solidifying chamber.

It is a further object of the invention to provide an apparatus for producing carbon dioxide ice without waste of the gas.

Further objects of the invention will appear from the following description when read in connection with the accompanying drawing showing an illustrative embodiment of the invention, and wherein:—

Figures 1, 2, 3:
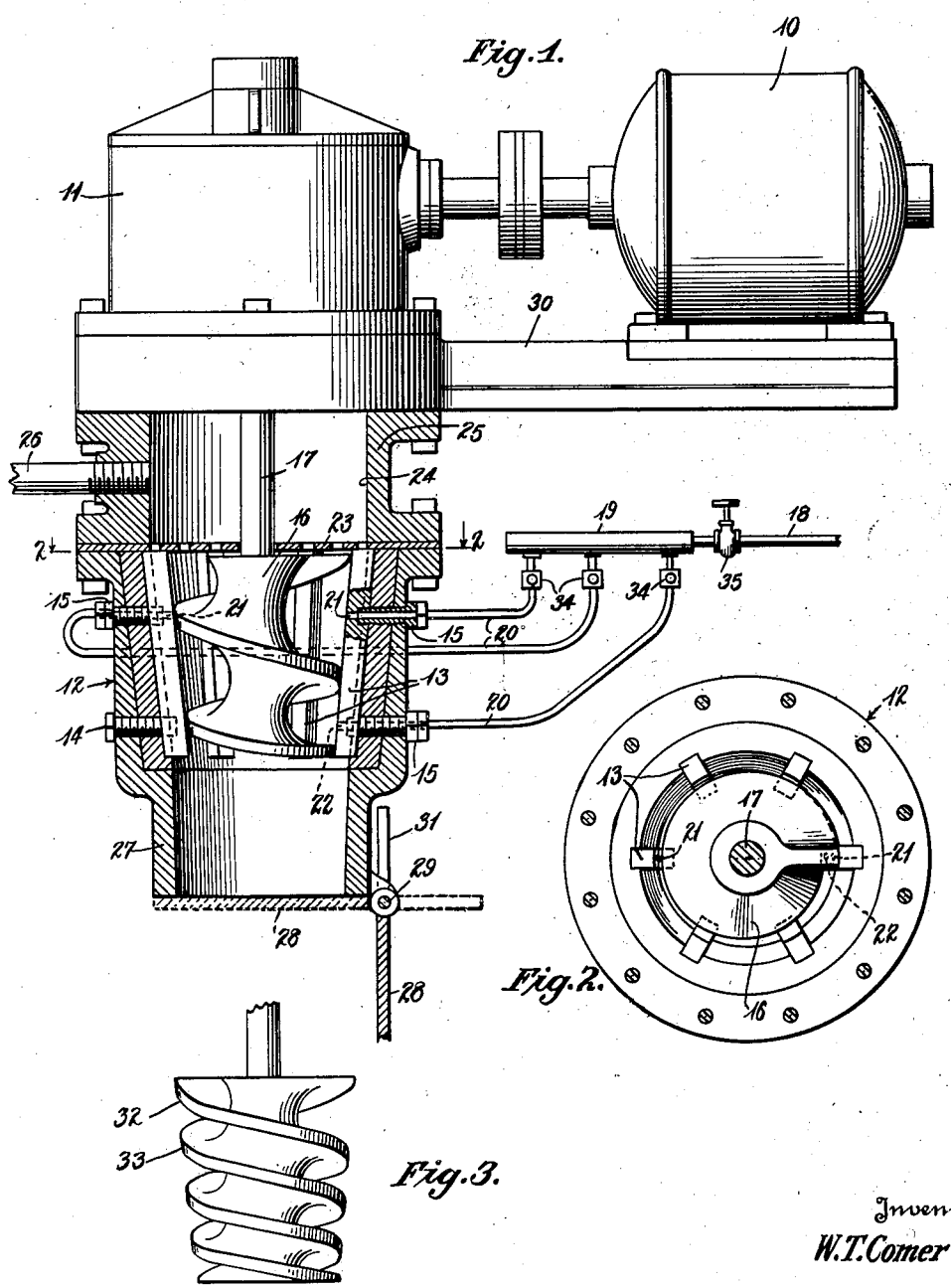
Fig. 1 is a side elevation partly in central vertical section.
Fig. 2 is a horizontal plan view of line 2—2 of Fig. 1.
Fig. 3 is a side elevation of a modified form of extrusion screw.

As shown the device comprises a motor 10 and a reduction gear 11 for drive of the apparatus, which parts are desirably mounted upon a common base 30 from which the solidifying mechanism may be suspended.

To solidify the material, there is shown a pot 12 having internal ribs or rifles 13, desirably secured in grooves in the pot 12, as by means of cap screws 14, 15. Desirably two cap screws are applied to each of the ribs 13 to hold the same in position. The pot 12 is shown in the drawing as formed in inner and outer portions, but for some reasons it may be desirable to form the pot of an integral cast material as of bronze.

To compact the material formed in the process, there is shown a compacting and extruding screw 16 rigidly mounted upon a shaft 17 driven by the motor 10 through reducing gear of any desirable form housed in the casting 11.

To form solid carbon dioxide the material under high compression is delivered from a compressor, not shown, through a conduit 18, to a header 19, from which tubes 20 are shown conducting the material to jets 21, 22 opening into the pot 12.

The sudden expansion of the compressed material in the pot 12 will result in the formation of a solid carbon dioxide in finely divided form, commonly termed snow in the art. Since the forming solid has a tendency to clog the openings of the jets 21, 22, it is desirable to bring these openings into the pot through the edges of the ribs 13, whereupon the revolution of the screw 16 wiping across the openings will clear them of such clogging material.

The sudden expansion of the material produces not only the snow referred to but also a portion of gas which escapes upwardly through the snow portion thus formed and is allowed to pass through the openings in a perforated plate or screen 23, into a chamber 24 provided by the flanged collar 25 secured between the pot 12 and the base 30. The escaping gas collected in the chamber 24 may be drawn off through a conduit 26, which may be placed into communication with the intake of the compressor, not shown, whereby no gas is wasted.

The passage of the gaseous portion of the expanded material through the already formed snow in the pot 12 will cool the same, resulting in the solidification of a further portion of the material, and any of the solid gathering upon the perforated plate 23 will be wiped off by the base of the screw 16 revolving closely adjacent thereto, to keep the perforations open.

To provide resistance to the action of the screw 16 whereby to compact the snow into a solid form of ice, there is shown a nozzle 27 extending downwardly from the pot 12, which nozzle is slightly tapered, being smallest at its lower end.

In the initiation of the operation of the device, it is necessary to provide some resistance to the movement of the mass through the nozzle 27, for which purpose there is shown a flap 28 shown as hinged at 29 to the nozzle 27, and provided with a handle 31, by which the flap may be held over the mouth of the nozzle to provide such resistance. The forming ice will then be compacted in the nozzle and the taper referred to will thereafter provide resistance sufficient to solidify the mass to the desired amount by action of the screw 16, the forming column of ice being extruded through the nozzle 27 as fast as compacted.

The necessary taper of the nozzle 27 is a matter for rather careful designing, and extended experiments have shown that in a nozzle six inches long and substantially eight inches in diameter a taper of one-eighth of an inch is satisfactory to sufficiently compact the ice and yet not provide too great resistance to the screw 16.

In the absence of the ribs 13 the compacted mass of ice will merely revolve with the screw 16 and no extrusion will result, thereby blocking the operation of the apparatus, which revolution is prevented by the ribs or rifles 13.

For some reasons and at some speeds of revolution, a form of screw such as shown in Fig. 3 is found preferable to the single thread screw 16 of Fig. 1. In Fig. 3 two parallel threads 32, 33 are shown. This form of screw provides a more frequent wiping of the jets and of the openings in the perforated plate 23. It will be understood that the plate 23 may be a finely perforated plate or a plate having larger openings covered by a reticulated screen.

By way of providing the jets 21, 22, it is convenient to bore certain of the screws 15 and attach the conduits 20 to the bore. Two jets 21 are shown adjacent the upper portion of the pot 12, and one jet 22 adjacent the lower portion thereof. If desired, a jet may be provided in each of the rifles 13 at both the top and bottom thereof, and valves 34 are desirably provided to enable the operator to throw into or out of action any other jets desired. A common valve 35 is shown to control the supply of material to the header 19. The lower jet or jets 22 may be used while starting the device into operation with the result of causing the gaseous portion of the expansion to pass through the majority of the formed snow. After compaction begins the jet 22 may be closed if desired by its valve 34.

In all former methods of producing carbon dioxide ice of which I am aware, the snow is produced in batches by expansion of the compressed gas or liquid carbon dioxide into a chamber until the chamber is partially filled with the snow, after which the chamber is opened and the snow dumped out to be shoveled into and tamped in forms in which the material is compacted into ice in a press. The expansion chamber is always full of air at the beginning of each batch and the moisture in this air is frozen out and mixed with the carbon dioxide snow. When the snow is discharged from the expansion chamber in contact with the air an additional amount of atmospheric moisture is frozen into it with a result that the ice product resulting is a mixture of carbon dioxide and water ice which is quite objectionable.

By the process of my invention air is totally excluded and no moisture is frozen into the product.

Minor changes in the form of the apparatus or in the steps of the process may be made within the scope of the appended claims without departing from the spirit of the invention.

I claim:

1. Apparatus for producing carbon dioxide ice which comprises, in combination, a chamber inwardly tapering toward an outlet, alternate elongated projections and depressions upon the inner surface of said chamber substantially parallel with the axis thereof, a jet for introduction of liquid carbon dioxide into the chamber opening through the crest of one of said projections, screw means revolubly mounted in said chamber the edge of the thread thereof revolving closely adjacent the crests of said projections.

2. Apparatus for producing carbon dioxide ice which comprises, in combination, a chamber inwardly tapering toward an outlet, alternate elongated projections and depressions upon the inner surface of said chamber substantially parallel with the axis thereof, a jet for introduction of liquid carbon dioxide into the chamber opening through the crest of one of said projections, screw means revolubly mounted in said chamber the edge of the thread thereof revolving closely adjacent the crests of said projections and an inwardly tapering outlet passage leading from the chamber.

3. Apparatus for producing carbon dioxide ice which comprises, in combination, an internally frusto conical expansion chamber open at its smaller end, and a gas collection chamber axially aligned and in communication with the base thereof, a foraminous diaphragm between said chambers, a compacting and extruding screw revolubly mounted in said expansion chamber to force material therein in the direction of its least diameter whereby to compact material against the resistance of the reducing diameter of the chamber, jet means to introduce liquid carbon dioxide under pressure into said expansion chamber and a gas removal conduit leading from said collection chamber.

4. Apparatus for producing carbon dioxide ice which comprises, in combination, an internally frusto conical expansion chamber open at its smaller end, and a gas collection chamber axially aligned and in communication with the base thereof, a foraminous diaphragm between said chambers, a compacting and extruding screw revolubly mounted in said expansion chamber to force material therein in the direction of its least diameter whereby to compact material against the resistance of the reducing diameter of the chamber, jet means opening into said expansion chamber at a point removed from said diaphragm whereby the gaseous portion of expanding carbon dioxide introduced thereby may pass through a portion of the finely divided solid produced by said expansion in passing to said collection chamber and a conduit leading from said collection chamber for removal of gas.

5. Apparatus for producing carbon dioxide ice which comprises, in combination, an expansion chamber of circular cross section, screw means extending axially thereof to compact material therein, a pair of jets for introduction of liquid carbon dioxide to be expanded in said chamber, said jets opening into said chamber respectively at points adjacent opposite ends thereof axially of said screw.

WILLIAM T. COMER.